Patented Feb. 25, 1930

1,748,533

UNITED STATES PATENT OFFICE

SIEGFRIED WEISSBEIN, OF BERLIN, GERMANY, ASSIGNOR TO BÄDER- UND VERKEHRS-AKTIEN-GESELLSCHAFT, OF BERLIN, GERMANY, A JOINT-STOCK COMPANY OF GERMANY

PROCESS OF MANUFACTURING DURABLE SOAP CREAMS CONTAINING HIGHLY-CONCENTRATED SALT SOLUTIONS

No Drawing. Application filed June 23, 1926, Serial No. 118,083, and in Germany July 16, 1925.

My invention relates to improvements in the process of manufacturing durable soap creams containing highly concentrated salt solutions. By the term highly concentrated salt solutions I desire to be understood that such solutions are meant thereby which contain at least 20% of salt, the preferred solution containing as much as 40 g. salt in 80 g. of water. It is known, that by a partial saponifying of fats in the presence of glycerine, durable emulsions may be made, which at the present time are generally used as a cream for cosmetic purposes. If according to the present practice a quantity of 10 parts of stearic acid is saponified one third and mixed with a quantity of 20 parts of glycerine, there may be incorporated into this mixture about 70 parts of water in order to prepare a cream for cosmetic purposes, without a separation of water. In the same manner durable emulsions may be obtained by employing 20% glycerine, if the stearic acid is transformed into its ammonium salt.

If, however such experiments are made with concentrated aqueous salt solutions instead of water, for instance, with a 20 per cent common salt solution (solution of sodium chloride), the emulsion will not be of permanent character. In this case the salt solution will be separated from the emulsion, in spite of the large contents of about 20% glycerine.

According to this invention durable emulsions may be obtained even with highly concentrated salt solutions containing as much as 40 g. of salt in 80 g. of water by rendering the fats able to cohere with water through addition of saponine ($C_{32}H_{54}O_{18}$). In this condition of the fat the water will not separate from the surface of the fat but adhere thereto. By the term saponine I desire to include extracts from soap bark, quillaja bark, root of the *Saponaria officinalis*, wood of quillaja and the like. In this case even the quantity of the glycerine may be considerably reduced. Thus, for instance, according to my invention the following combination may be mixed up into a cream whose constituents will not separate: 54 g. of fat, 8 g. of KOH, 6 g. of water, 10 ccm. of alcohol and 0,01 g. of saponine are saponified upon the water bath and stirred at a temperature of about 90–100° C. together with a solution of 40 g. of common salt in 80 g. of water, 0,01 g. of saponine and 10 g. of glycerine, said solution having about a temperature of 80–100° C. in initial condition. This mixture is further mixed or agitated for about five to ten minutes until it will cool-off without the application of any special cooling means.

A further example may be given which results into a cream whose constituents will not separate. This example is as follows: A quantity of 54 g. of cocoa fat is molten upon a water bath in a porcelain tray and mixed in hot condition (90–100° C.) with a solution of 8 g. of solid caustic potash in 6 g. of water and stirred for several minutes. After about five minutes, a quantity of 10 ccm. spirit is added and furthermore 10 ccm. of glycerine before completing the saponification. Thereupon the mixture is further stirred upon the water bath, until the consistency of the mixture has become heavily gelatinous. Thereupon the mass is stirred in hot condition by means of a large pestle, the contents of the tray removed from the steam bath together with a solution of 40 g. of Oeynhausen salt in 80 ccm. of water, which solution is mixed shortly before its addition with 2 ccm. of an aqueous solution of saponine (1:100, corresponding to 0.02 g. of saponine). Oeynhausen salt consists essentially of sodium chloride (NaCl), magnesium chloride ($MgCl_2$) and sulfate of sodium ($Na_2SO_4$), chloride of potassium (KCl) and sulphate of magnesium ($MgSO_4$). This mixture contains at first within an aqueous liquid the soap in the form of gelatinous globules, which will gradually become more solid and of greater consistency after stirring the mass for about 5 to 10 minutes. Finally the mass will assume a cream-like consistency by continuously mixing and agitating the same by means of the pestle until it has become cool without the application of any special cooling means after having previously added a quantity of 14 ccm. of oleum gaultheriæ. Preferably the entire procedure of mixing of the completely boiled soap, salt solution and oil of wintergreen may be carried out in an emulsion apparatus. In a manner similar to that described herein, all medicinal salts of proper constituency, may be brought into creamy condition even though in highly concentrated form. By this invention therefore the novel result is obtained, that medicinal salts which are present in highly concentrated form in natural mineral waters may be used in the form of soap cream, thus combining the curative effect of the medicinal salts with the property of the soap cream causing a stimulating effect upon the flow of blood through the skin.

I claim:

The process of preparing a therapeutically effective, durable soap-cream from a highly concentrated salt solution, which process consists in adding a small quantity of saponine to said salt solution, mixing said salt solution together with the saponine therein with over-fattened soap-cream in hot condition, and thereupon stirring the mixture until it will cool-off.

In testimony whereof I hereunto affix my signature.

PROF. DR. SIEGFRIED WEISSBEIN.